April 29, 1952 D. H. CAMPBELL 2,595,124

FREQUENCY DIVIDER

Filed April 26, 1949 2 SHEETS—SHEET 1

*INVENTOR.*
DAVID H. CAMPBELL
*BY* William R. Lane
ATTORNEY

INVENTOR.
DAVID H. CAMPBELL
BY William R. Lane
ATTORNEY

Patented Apr. 29, 1952 2,595,124

UNITED STATES PATENT OFFICE 2,595,124

FREQUENCY DIVIDER

David H. Campbell, Los Angeles, Calif., assignor to North American Aviation, Inc.

Application April 26, 1949, Serial No. 89,675

6 Claims. (Cl. 250—27)

This invention pertains to frequency dividers and specifically to a frequency divider having an adjustable ratio of division. It further pertains to securing precise frequency division at a preselected ratio.

In the past a serious defect in variable ratio frequency dividers has been the fact that slight variations in plate supply voltage or component characteristics would affect the stability of the divider and cause erroneous results. It is therefore an object of this invention to provide an improved frequency divider which is largely independent of fluctuations in plate supply voltage.

It is a further object of this invention to provide a frequency divider which does not have to be re-calibrated whenever circuit components are replaced with new parts.

It is a further object of this invention to provide a frequency divider with a variable ratio of division which is largely independent of power supply fluctuations.

It is a further object of this invention to provide a highly stable frequency divider of variable division ratio adapted to be used in a chain of frequency dividers where the total division amounts to several times the division attained in a single frequency divider.

It is yet a further object of this invention to provide a frequency divider of the blocking oscillator type which incorporates means for maintaining the bias on the blocking oscillator automatically constant.

Other objects of invention will become apparent from the following description taken in connection with the accompanying drawings in which.

Figure 1:
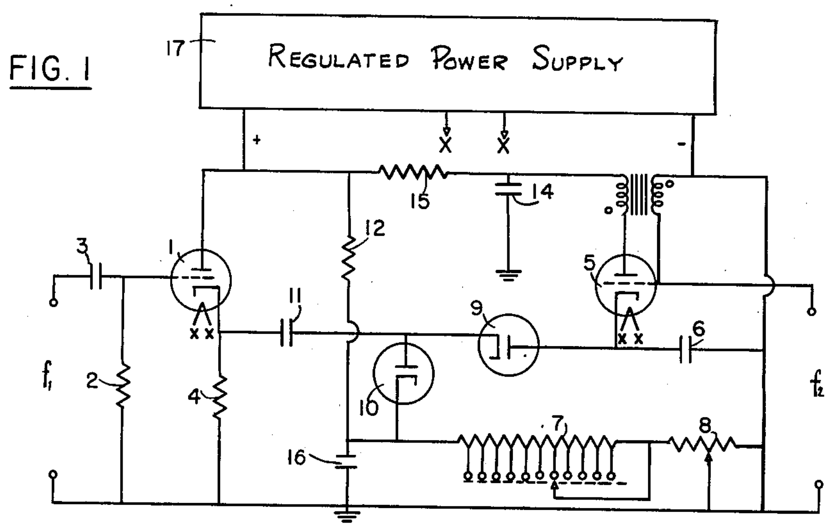
Fig. 1 is a circuit diagram of a conventional frequency divider.

Referring to Fig. 1, an input frequency $f_1$ is applied to the grid of tube 1 across resistor 2 through coupling capacitor 3. Cathode bias on tube 1 is furnished by resistor 4. Blocking oscillator 5 emits pulses of a frequency equal to 1/N times $f_1$ where N is the ratio of division required. The bias on blocking oscillator 5 is controlled by capacitor 6 which is periodically charged and then fractionally discharged by each input pulse. Resistances 7 and 8 form a cathode resistor for blocking oscillator 5, resistance 7 being adjustable to regulate the ratio of division required. Rectifiers 9 and 10 are connected in series between the cathode of blocking oscillator 5 and resistor 7, and condenser 11 connects the cathode of tube 1 to the cathode of rectifier 9 and the plate of rectifier 10. Resistance 12 is provided as a bleeder resistor for the plate of tube 1. Note also that resistance 8 is adjustable, adjustment being required to compensate for changes in characteristics of circuit components such as occurs upon the replacement of old tubes with new. Condenser 14 and resistance 15 operate to "decouple" blocking oscillator 5 from the rest of the circuit so that when a heavy pulse of plate current flows little effect is felt by other plates connected to the same plate voltage source. Condenser 16 connects the cathode of rectifier 10 to the negative side of regulated plate supply 17.

Figure 3:
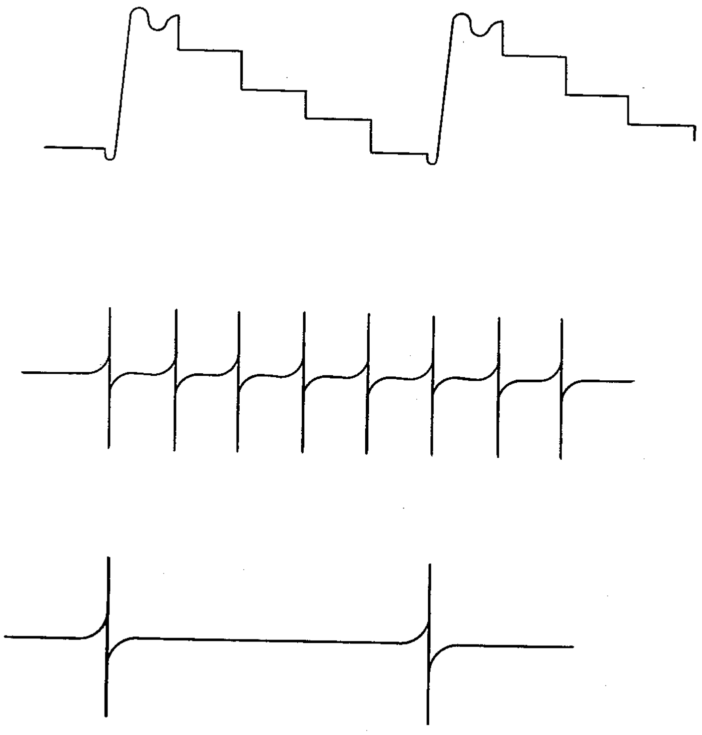
Fig. 3 is an oscilloscope type presentation of pulses and voltages obtained in the device shown in Fig. 2.

Operation of the device shown in Fig. 1 is best discussed with reference to Fig. 3 where the uppermost graph shows the charge on condenser 6 plotted against time. Assuming that it is desired to divide frequency divider $f_1$ by five with this device, the input frequency $f_1$ is shown on the second line of Fig. 3 and the output $f_2$ is shown on the lower line in Fig. 3. The action required is to cause blocking oscillator 5 to fire once for every five input pulses. Therefore, if the bias on blocking oscillator 5 is established at a value that completely prevents conduction of the tube and if that bias is progressively reduced in steps each time an input pulse of frequency $f_1$ is received until the bias is so reduced that blocking oscillator 5 fires after the fifth input pulse, the output frequency will be one-fifth the input frequency. However, as can be seen by reference to the upper graph in Fig. 3, if the effective bias on blocking oscillator 5 is for any reason varied beyond the limits of the steps in bias reduction shown, the blocking oscillator fires not on the fifth but possibly on the fourth or sixth pulse, thus destroying the accuracy of the device. For this reason, in the past, it has been required to construct very complicated and refined power supplies for use in frequency dividers of this type. Power supply 17 shown in Fig. 1 is such a regulated power supply. Further, circuit components, such as tubes, whose characteristics are known to vary with age had to be carefully checked upon replacement and adjustment of the circuit had to be made to compensate for such changes. Such an adjustment is embodied in resistance 8 which would be readjusted if blocking oscillator 5 were replaced. Also, variations in amplitude of input frequency $f_1$ would have a like deleterious effect.

Figure 2:
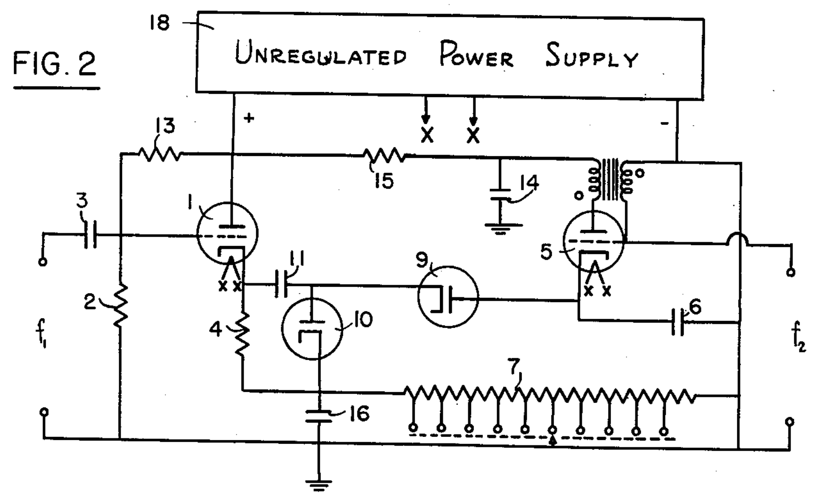
Fig. 2 is a circuit diagram of the improved frequency divider of this invention.

Turning now to Fig. 2, there are shown the principal improvements embodied in this invention. A resistance 13 is added between the plate and grid of tube 1 to form a voltage divider with resistance 2. Resistance 4 is connected in series with resistance 7 and resistance 8 is also removed. Resistance 12 is no longer necessary since any fluctuations in plate voltage are taken care of automatically by the action of resistance 13, resistance 2, and the fact that resistance 4 is connected in series with resistance 7. Fluctuations in plate voltage, therefore, change the bias on tube 1 automatically and also change the amount by which each pulse affects the bias on blocking oscillator 5. The correct bias on blocking oscillator 5 for stable operation is thus caused to correspond automatically with any variations in power supply values or in the characteristics of circuit components. Regulated power supply 17 can therefore be replaced by unregulated power supply 18 as shown in Fig. 2.

Referring again to Fig. 2, it can be seen that tube 1 is connected as a cathode follower, and has an amplification of less than 1.0. The use of tube 1 prevents fluctuations caused by the firing of blocking oscillator 5 from being communicated to previous divider stages whose output is connected to the input of tube 1. In this way tube 1 serves to isolate or "insulate" each divider stage from the stages preceding and following it.

Another purpose served by tube 1 is that of limiting the amplitude of the input signal to the blocking oscillator. It can be seen by reference to Fig. 3 that if the input signals vary in amplitude, more or less than one step may be traversed as a result of each pulse, thus causing premature or late firing of blocking oscillator 5. However, since tube 1 acts as a cathode follower with an amplification of less than one, a considerable variation in the amplitude of the input pulses results in a negligible variation in the amplitude of the pulses applied to the blocking oscillator.

Tube 1 also functions as a bias compensator in that if the bias on blocking oscillator 5 tends to change, thus changing the voltage drop across ratio selector 7, tube 1 automatically draws more or less current to restore the change in voltage drop from the cathode of tube 1 to ground and hence restores the change in voltage drop across resistance 7. The bias on blocking oscillator 5 is therefore automatically maintained at a constant and fixed value determined by the setting of ratio selector 7. A large number of frequency dividers of this type may be connected in series and no ill effects are experienced in one stage as a result of firing of a neighboring stage.

It is to be noted that rectifiers 9 and 10 function as a step charge rectifier in that every pulse appearing on the cathode of tube 1 is transmitted through rectifier 9 to condenser 6 and reduces the charge on that condenser by a predetermined fraction of its total charge thus reducing the bias on blocking oscillator 5. The charge thus accumulated on condenser 6 is supplied by rectifier 10 which draws electrons through resistor 7 from the opposite side of condenser 6. Cathode follower 1 therefore acts as an induction pump in that no electrons from the cathode of tube 1 ever actually travel to condenser 6 but by means of condenser 11 electrons are induced to enter by rectifier 10, to leave by rectifier 9 and to travel around the circuit connected to the opposite sides of condenser 6.

When the charge on condenser 6 is reduced to the point where the bias on the blocking oscillator no longer prevents firing, the tube conducts, charging the right hand side of condenser 6 heavily negative and sending an output pulse to the output terminals. The left hand side of condenser 6 is then positively charged, i. e., has a paucity of electrons. The succeeding pulses of electrons from the step charge rectifier then gradually and successively replenish the supply of electrons on condenser 6 until blocking oscillator 5 again fires.

Although the invention has been described and illustrated in detail, it is to be clearly understood that the same is by way of illustration and example only and is not to be taken by way of limitation, the spirit and scope of this invention being limited only by terms of the appended claims.

I claim:

1. Frequency divider means comprising a blocking oscillator with a condenser connected between its cathode and the negative side of its plate power supply and a variable cathode bias resistor, a cathode follower having its grid connected as a voltage divider between the positive and negative terminals of its plate supply voltage and its cathode resistor connected in series with the cathode resistor of said blocking oscillator, a step charge rectifier adapted to convey pulses of electrons to the cathode condenser of said blocking oscillator in response to pulses received by said cathode follower to thereby discharge said condenser in steps causing said blocking oscillator to fire at a frequency which is a submultiple of the frequency applied to the cathode follower.

2. Frequency divider means comprising a blocking oscillator, condenser means for maintaining bias on the cathode of said blocking oscillator, cathode follower means characterized by having its grid connected as a voltage divider between the positive and negative terminals of plate supply voltage and its cathode resistor connected in series with the cathode resistor of said blocking oscillator and means responsive to energy pulses on said cathode follower for steppingly reducing the charge on said condenser means to thereby cause said blocking oscillator to fire at a frequency which is a precisely constant fraction of the frequency of pulses applied to said cathode follower.

3. In combination, a blocking oscillator characterized by having a condenser connected between its cathode and the negative side of its plate power supply, a variable cathode bias resistor and a step-charge rectifier connected in series, a cathode follower having its grid connected as a voltage divider between the positive and negative terminals of plate supply voltage and its cathode resistor connected in series with the cathode resistor of said blocking oscillator, said step charge rectifier being connected to the cathode of said cathode follower to discharge said blocking oscillator cathode condenser in steps whereby the firing frequency of said blocking oscillator is a fraction of the input frequency to said cathode follower.

4. In a frequency divider having a blocking oscillator including a bias condenser and a variable bias resistor, a step charge rectifier for discharging said blocking oscillator bias condenser, a plate supply voltage source and a cathode follower including a cathode bias resistor for furnishing input to said blocking oscillator, the improvement comprising a conductive connection between the grid of the cathode follower and the positive and the negative terminals of said plate supply voltage source, and a conductive connection between the cathode bias resistor of said cathode follower and the bias resistor of said blocking oscillator to thereby eliminate the influence of power supply variations over the ratio of frequency division as established by the setting of said last named resistor.

5. Frequency divider means comprising a source of direct current having a positive terminal and a negative terminal, a cathode follower whose plate is connected to said positive terminal, a voltage divider connected across said positive and negative terminals with the grid of said cathode follower maintained at the divided voltage, a blocking oscillator having a capacitor for maintaining cathode bias, and a step-charge rectifier connected in series with the cathode resistor of said blocking oscillator adapted to discharge said cathode bias condenser through capacity coupling to the cathode of said cathode follower, said cathode follower being characterized by having its cathode resistor connected in series with the cathode resistor of said blocking oscillator and said step charge rectifier.

6. Frequency dividing means comprising a thermionic tube having at lease a plate, a grid, and a cathode, and an input circuit comprising two terminals, a resistance between said terminals and a resistance between said grid and said plate, said plate being connected to the positive terminal of a source of direct current, a second thermionic tube, a resistance and a transformer winding connected in series between the plates of said two tubes, said transformer winding being connected to the plate of said second tube, a second transformer winding having a common core with said first such winding connected between the grid of said second tube and the negative terminal of said source of direct current, a condenser connected from said negative terminal to the plate of said second tube through said first named transformer winding, a condenser and two rectifiers, one side of said condenser being connected to the plate of one of said rectifiers and to the cathode of said second rectifier and the other side of said condenser being connected to the cathode of said first named tube, the plate of said second named rectifier being connected to the cathode of said second named tube, condenser means connecting the cathode of said first named rectifier and said negative terminal, condenser means connecting the cathode of said second tube to said negative terminal, resistance means between the cathode of said first named tube and the cathode of first named rectifier, and a variable resistance connected between the cathode of said first-named rectifier and said negative terminal, whereby the signal frequency between said negative terminal and the grid of said second tube is a proper fraction of the signal frequency applied to said input circuit.

DAVID H. CAMPBELL.

REFERENCES CITED

The following references are of record in the file of this patent:

UNITED STATES PATENTS

| Number | Name | Date |
|---|---|---|
| 2,316,577 | Ford | Apr. 13, 1943 |
| 2,415,567 | Schoenfeld | Feb. 11, 1947 |
| 2,435,414 | Sziklai | Feb. 3, 1948 |
| 2,475,613 | Hastings | July 12, 1949 |